United States Patent Office 2,781,326
Patented Feb. 12, 1957

2,781,326

MOLDING COMPOSITION

Ellis Lewis, Jr., Jenkintown, Pa., assignor to American Viscose Corporation, Wilmington, Del., a corporation of Delaware No Drawing. Application August 23, 1952,
Serial No. 306,061

4 Claims. (Cl. 260—14)

This invention relates to plastic molding compositions which when subjected to the combined action of heat and pressure in a mold yield hard, finished articles. It relates particularly to such compositions which include synthetic resins of the heat-hardenable thermosetting type.

In general, the object of this invention is to provide an improved molding composition comprising a synthetic, plastic, potentially thermosetting resin precondensate and a novel filler which possesses properties which render it of commercial value, particularly with respect to the toughness, resilience and impact strength of articles molded therefrom. It is important, for most uses, that articles molded from the thermosetting resins be characterized by toughness, good impact strength and resilience. Not all of the molding compositions comprising a thermosetting resin and a filler which are known yield molded articles having an impact strength sufficiently high to render the compositions suitable for the production of relatively inexpensive molded articles. For example, while articles molded from compositions comprising a thermosetting resin and cotton flock as a filler have satisfactory impact strength and are relatively non-brittle, those articles which are molded from compositions comprising a thermosetting resin and wood flour as a filler have relatively low impact strength and are quite brittle. However, cotton flock is a comparatively expensive filler and its use is more or less restricted to compositions intended to be molded into articles destined for the high-price markets so that the competitive advantage of the molded resin articles as substitutes for metal articles, for instance, is somewhat offset. Wood flour is a less expensive filler than cotton flock but as pointed out above it is not satisfactory as the sole or primary filler when molded articles of high impact strength are required.

One object of the present invention is to provide a molding composition comprising a thermosetting resin precondensate and a cellulosic filler which is less expensive than cotton flock, the composition being adapted to be molded into articles characterized by toughness and resilience and an impact strength higher than that of similar articles molded from a composition comprising the thermosetting resin precondensate and wood flour as the filler. Another object is to provide an improved molding composition comprising a thermosetting resin precondensate which can be molded to articles having lower specific gravity than similar articles molded from compositions comprising the thermosetting resin precondensate and cotton flock as filler. A further object is to provide comparatively inexpensive molded articles having high impact strength.

In accordance with the invention, it is found that cotton particles which carry a non-fibrous cellulose ester thereon constitute a very desirable filler for the thermosetting resins and that articles molded from compositions comprising a thermosetting resin precondensate and those cotton particles either as the sole filler or as the primary filler have superior impact strength as compared with articles molded from compositions comprising the thermosetting resin precondensate and a filler consisting essentially of wood flour.

The filler comprising cotton particles carrying the non-fibrous cellulose ester can be obtained, for instance, by saturating a cotton fabric, or a wadding, pad, batting, web or the like of cotton fibers, which wadding may or may not be provided with an enveloping or covering protective open-mesh cotton fabric, such as cotton gauze, with a solution or dispersion of a cellulose ester in a suitable solvent or dispersing liquid, drying the impregnated material, and then reducing it to a mass of short fibers and linters, herein referred to broadly as cotton particles, which are impregnated with the ester and/or have the ester adhered to their surfaces in the form of a film or coating or as particles or lumps. Whenever it is stated herein that the cotton fibers, or cotton particles, carry a non-fibrous cellulose ester it is intended to mean that the fibers or particles are impregnated with the ester and/or have the ester adhered to their surfaces.

The cellulose ester carried by the cotton particles may be any organic solvent-soluble ester of cellulose with an organic or inorganic acid, including mixed cellulose esters. Examples of the esters which may be used are cellulose acetate, cellulose propionate, cellulose butyrate, cellulose acetate-butyrate, cellulose acetate-propionate, cellulose nitrate, etc. A convenient source of the filler of the invention is the cotton wadding, pad or batt resulting from filtering cellulose ester dopes in the course of preparing the dopes for use in lacquers or for delivery to a spinnert or other shaping device.

It is the common practice to filter the dope, which comprises a solution or dispersion of the cellulose ester in a suitable solvent or dispersing liquid, for example a solution or dispersion of commercial cellulose acetate in acetone or a solution or dispersion of cellulose nitrate in a mixture of ether and alcohol, by passing it through a pad or wadding of cotton fibers usually protected by a cotton gauze covering, before incorporating the dope in a lacquer, extruding it through a spinneret or other shaping device, or otherwise using it. The dope is passed continuously through the gauze-covered wadding or so-called "filter dressing" and in time the wadding becomes clogged with the retained dope and has to be discarded. It is this saturated filter medium, which has heretofore been regarded as waste material and discarded, which is used as the preferred source of the novel filler of the invention. The dope-saturated wadding may be dried and reduced (ground, shredded, cut or otherwise disintegrated) to a mass of short fibers and linters carrying the cellulose ester and having any desirable length but preferably after the grinding the fibers have a length of the order of one-half millimeter to one millimeter. The filler thus obtained is less expensive than cotton flock especially since it is obtained from a waste material. On the same basis, it compares favorably in cost with wood flour and has the advantage over the latter that the articles molded from compositions comprising it and a thermosetting resin precondensate have increased toughness and impact strength.

Any heat-hardenable resin which, in the form of a precondensate or partial polymerizate, may be shaped by conventional molding procedures and set in the molded shape by heat-curing may be employed as the resin binder of the composition as, for example, phenol-formaldehyde resins such as Bakelite, urea-formaldehyde resins, melamine-formaldehyde resins and others possessing the properties which render them suitable for use in the production of molded, extruded and like products. Resins prepared from phenol and formaldehyde are typical heat-hardenable resins used for plastic molding, but in place of phenol there may be used substituted phenols such as cresol, xylenol, amyl phenol, resorcinol or their homologs, derivatives or their mixtures, and in place of formaldehyde there may be used other aldehydes and ketones having a reactive methylene or substituted methylene group such as paraformaldehyde, furfural, acrolein or their homologs, polymers or derivatives.

The thermosetting resin precondensate, i. e., the resin prior to heat-hardening thereof and in the thermoplastic state, may be made by polymerizing or condensing the resin-forming constituents to the desired extent for example in the case of a phenol-formaldehyde resin by polymerizing the constituents to the B-stage in which the condensate occurs in powered or granular condition. During the course of its production, the precondensate may be blended with various adjuvents or assistants including an alkaline catalyst such as is usually incorporated in those precondensates adapted for hot-molding, mold lubricants, plasticizers, dyes, pigments, etc. Or the resin precondensate may be a commercially available product comprising a particulate solid and in which the adjuvants have been incorporated in preparing the precondensate for marketing. Such commercial products may be further modified by means of various adjuvants for use in practicing this invention, if desired.

The proportion of thermosetting resin precondensate and of primary filler consisting of the cotton particles carrying the non-fibrous cellulose ester may vary rather widely, but preferably the composition comprises from 10% to 50% by weight of the thermosetting resin precondensate. The balance of the composition may consist of the cotton particles carrying the ester. In one presently specifically preferred embodiment the composition comprises about 50% of a thermosetting resin precondensate, which may have small amounts, e. g., up to 5% of mold lubricants, pigments, dyes, etc. admixed therewith, and 50% of the cotton fibers or fibrous particles carrying the non-fibrous cellulose ester.

In the present composition, the cotton fibers or particles impregnated with the non-fibrous cellulose ester and/or having the ester adhered to their surfaces in film or particulate form constitute the primary filler. However it is within the scope of the invention to include one or more auxiliary fillers in the composition, provided that the primary filler is present in an amount of at least 50% by weight based on the total weight of the filler materials present. Examples of auxiliary fillers which may be used in combination with the primary filler include cotton flock or fabric, alpha cellulose, wood pulp, mineral fillers such as asbestos and mica, inorganic fillers such as powdered slate, gypsum, china clay, zinc oxide and infusorial earths, rubber, horn, an absorbent substance such as activated magnesium silicate, activated carbon, silica gel, activated alumina, fuller's earth, activated bleaching clay, activated bauxite, French chalk or the like, starch, pumice, cork, fibers or cuttings of silk, regenerated cellulose wool, linen, nylon, glass fibers or cuttings of glass cloth, fibers of polymeric or copolmeric acrylonitrile or cuttings of cloth made therefrom, and the like.

The composition will usually also include small amounts of the conventional molding adjuvants, such as the mold lubricants, pigments, plasticizers, and dyes mentioned above, such as 2% of zinc stearate and/or 2% of a dye or pigment. Various effect materials, such as metallic particles which may be included in the compositions for decorative purposes are included in the term "auxiliary fillers" as used herein so that when it is stated that the primary filler constitutes at least 50% by weight on the weight of all filler materials present, it is intended to mean that the primary filler constitutes at least 50% by weight of the filler material, inclusive of such effect materials. For the present purposes, "filler materials" are regarded as all materials present in the composition other than the thermosetting resin precondensate and such minor amounts of the usual molding adjuvants as may be present. Also, the cellulose ester carried by the cotton particles may contain small amounts of modifying agents such as coloring substances and plasticizers. The presence of such modifiers in the ester, or of suitable modifiers such as dyes in the cotton fibers is allowed for in the use of the term "comprising" or "comprises" as applied to the primary filler.

In general, then, the molding composition of the invention comprises, by weight based on the total weight of the composition, from 10% to about 50% of a thermosetting resin precondensate and a primary filler comprising the cotton particles carrying a non-fibrous cellulose ester in an amount equal to at least 50% by weight based on the total weight of all filler materials present. The term "10% to about 50% of a thermosetting resin precondensate" allows for the presence of small amounts of mold lubricants and the like conventional molding assistants which may be mixed with the precondensate or otherwise incorporated in the composition.

As previously indicated, the primary filler comprising the cotton particles carrying the non-fibrous cellulose ester may constitute as high as 90% of the molding composition, based on the total composition weight. When the thermosetting resin precondensate comprises 10% by weight of the composition, the primary filler comprising the cotton particles carrying the non-fibrous cellulose ester is present in an amount of at least 45%, on the total composition weight. At the other extreme, when the thermosetting resin precondensate comprises 50% of the composition by weight, the primary filler is present in an amount of at least 25% on the composition weight. The maximum proportion of auxiliary fillers which is present, therefore, is 45%. Smaller amounts of auxiliary fillers, for instance as little as 5% by weight on the composition weight, may be used.

In the primary filler, obtained by saturating a batting, carded web or the like of cotton fibers with the cellulose ester solution or dispersion, drying the batting and reducing it to a mass of short fibers and linters carrying the dried and hardened ester, the mass usually comprises 50% by weight cotton particles and 50% by weight of the non-fibrous cellulose ester but this may vary somewhat and the ground mass may comprise by weight from 45% to 55% of the fibrous cellulose (cotton particles) and, conversely, from 55% to 45% of non-fibrous cellulose ester, substantially all of the ester being adhered to the cotton particles. The proportion of non-fibrous cellulose ester in the molding composition, on the total composition weight, will therefore also vary somewhat depending on the proportion of primary filler present. Thus, if the primary filler comprises 90% by weight of the composition, the proportion of non-fibrous cellulose ester by weight on the total composition weight, is between about 41% and about 49%, whereas if the primary filler comprises 50% by weight of the composition, the proportion of non-fibrous cellulose ester by weight on the total composition weight is between 22.5% and 27.5%. In the preferred embodiment, in which the primary filler comprises 50% by weight of the composition and the ratio of fibrous cellulose to non-fibrous cellulose ester is approximately 50:50, the proportion of non-fibrous cellulose ester on the composition weight is generally approximately 25%. In those compositions including auxiliary fillers, for example those containing about 25% by weight of the thermosetting resin precondensate, 37.5% by weight of the primary filler, and the balance auxiliary filler material, the proportion of non-fibrous cellulose ester present is between about 17% and 21% on the total composition weight.

In general, the invention contemplates a dry, particulate or granular molding composition which comprises an intimate mixture or blend of, by weight on the total composition weight, from 10% to about 50% of a thermosetting resin precondensate, at least 45% of a primary filler comprising cotton particles carrying a non-fibrous cellulose ester and in which the ratio of fibrous cellulose to non-fibrous cellulose ester is between 45:55 to 55:45.

and, optionally, from 0 up to 45% of auxiliary filler material defined herein.

The molding compositions of the invention may be obtained by mixing or blending the granular resin precondensate and filler in any suitable way, using any suitable mixing device such as a ball mill or mixing rolls.

These compositions may be readily molded by known compression and transfer techniques, either directly, in bulk, or after preliminary shaping into pellets or the like preforms or blanks to facilitate handling and shipping, and yield shaped molded articles characterized by desirable resilience and high impact strength, which useful characteristics are attributed to the presence of the non-fibrous cellulose ester which may be regarded as a binder supplementing the binding action of the thermosetting resin and substantially all of which is carried by the cotton particles. Another important advantage of the filler comprising the cotton particles carrying the non-fibrous cellulose ester is that, since the ester is carried by and intimately associated with the cotton particles, it tends to bond the adjacent fibers of the mass together as soon as it begins to soften and become tacky under the influence of the heat to which it is subjected in the mold, and it is unnecessary to depend on flow of cellulose ester fibers or other thermoplastic fibers for bonding of the filler fibers to each other, to the resin, and to auxiliary fillers, if such are present. This presents the possibility of using shorter molding cycles and/or lower molding temperatures than are normally required when the supplementary binder, whether a cellulose ester or other thermoplastic, is used in the form of fibers or individual particles not initially adhered to or carried by the filler fibers.

The temperature and pressure conditions under which the compositions are molded may vary but preferably the molding is performed at temperatures in the range 135° C. and 195° C., most desirably 145° C. and 165° C., under pressures which may vary between 1000 lbs./sq. inch and 6500 lbs./sq. inch. The molding cycle may vary between 5 minutes and 15 minutes or it may be of shorter or longer duration, depending on the speed of cure of the resin, the thickness of the molded article, the overall size of the article and the temperature. In molding the new compositions by conventional compression molding methods it is generally preferred to apply the pressure simultaneously with the application of heat to the mass in the mold, that is, to apply the pressure to the mass and then bring the mass to the desired temperature of molding while maintaining the pressure. This procedure is not an absolute requirement and the mass in the mold may be heated to the desired elevated molding temperature before the pressure is applied. However, as indicated, the preferred practice is to apply the pressure and maintain it while bringing the mass to the molding temperature, especially when molding articles of large cross-section.

The pressure is, of course, maintained during the curing time. The compositions may also be molded by the heatronic molding method in which the mass is brought to molding temperature in a high frequency electrostatic field and then transferred, without loss of plasticity, to a conventional mold.

Shaped molded articles of all kinds may be made by subjecting the new composition to increased temperature and pressure in an appropriate stationary mold or by continuously forcing the composition through a heated extrusion device to produce rods and tubes having any desired cross-section for example circular or oval. Among the articles which may be obtained there may be mentioned, as purely illustrative, steering wheels for automobiles, radio panels, cash carrier cups, closet seats, washers, caster wheels, wheels for vacuum cleaners, carpet sweepers or the like, buttons, and coathangers. By the inclusion of lubricious fillers of the type of graphite, oil-less bearings, washers, packings etc. may be obtained.

By the inclusion of powdered metallic materials in the composition there may be obtained anti-frictional discs adapted to be used for low-frictional purposes in the pump and shaft-sealing art, such as shaft bearings and contact members for rotary or reciprocating engagement.

The molded articles may be subjected to any desired or necessary finishing operation and, as is usual in the plastics industry, the term "finishing" as used herein is used broadly to cover those operations subsequent to or supplementing the actual molding or fabricating processes, such as sanding, punching, blanking, shearing, trimming, shaving, buffing or polishing, and, in the case of compression-molded articles, de-finning. Many of these finishing operations cannot be performed on brittle molded articles such as may be obtained by molding compositions comprising wood flour as the sole or primary filler.

Any of the aforementioned articles, and many others, may be molded from the compositions. However, in the following examples, in which the parts are by weight unless otherwise specified, standard molds and tests as established by the American Society for Testing Materials (ASTM) were used. The impact strength was determined by the notched Izod impact strength test and is given, as is customary, in foot pounds per inch of notch.

*Example 1*

A dope comprising commercial cellulose acetate in acetone was passed through a cotton batting provided with a gauze covering until the batting was thoroughly impregnated with the dope. The dope had a viscosity such that, after passing through the wadding, it could be extruded through a spinneret to form filaments. The impregnated, covered wadding was then dried and ground to obtain a mass comprising linters and short fibers having a length between one-half millimeter and one millimeter, and carrying the non-fibrous cellulose acetate. By acetyl analysis, it was found that the ground mass comprised, by weight, 50.7% of fibrous cellulose (cotton fibers and linters) and 49.3% of non-fibrous cellulose acetate, essentially all of which was carried by the fibers and linters.

Fifty parts of the ground mass and about 50 parts of a phenol-formaldehyde resin precondensate in the B-stage (or the product marketed commercially by Bakelite Corporation as BR17772), 2 parts of zinc stearate and 2 parts of carbon black were mixed thoroughly in a ball mill. Weighed portions of the mixture were molded according to ASTM-designation D256–43T, to obtain impact specimens having the dimensions 5" x ½" x ½", by heating the mass in the molds required by that method to 157° C. under a pressure of 4700 lbs./sq. inch and maintaining the mass at that temperature and pressure for 8 minutes. The molds were then cooled and opened. The molded articles had an average impact strength of 0.44.

*Example 2*

Fifty parts of the primary filler obtained as described in Example 1 and fifty parts of a prepared phenol-formaldehyde resin precondensate (or the product marketed commercially by Monsanto Chemical Company as Resinox 706) were blended and molded as in Example 1. The molded impact specimens had an average impact strength of 0.38.

*Example 3*

Fifty parts of the primary filler obtained as in Example 1, about 50 parts of the phenol-formaldehyde resin precondensate marketed commercially by Bakelite Corporation as BR17772, 2 parts of carbon black and 1 part of zinc stearate were blended together and the blend was molded under the conditions prescribed in ASTM-designation D651–42T, at a temperature of 149° C. and under a pressure of 4700 lbs./sq. inch. The molded specimens thus obtained had an average impact strength of 0.40.

All of the articles obtained by molding the compositions consisting essentially of the thermosetting resin precondensate and the primary filler of the invention possessed higher impact strength than similar articles obtained by molding a composition consisting essentially of the thermosetting resin precondensate and wood flour under equivalent conditions. For example, the specimens molded from the precondensate-wood flour composition under the conditions of Example 1 had an average impact strength of only 0.35, and were less resilient and more brittle than the molded articles of the invention.

In the foregoing discussion emphasis has been given to the desirability of using the primary filler in an amount equal to at least 50% on the total weight of the fillers present, that is the combined weights of the primary filler and any auxiliary fillers used with it. This is to insure that the molded articles have the maximum impact strength which it is possible to obtain when fillers other than the cotton fibers carrying the non-fibrous cellulose ester are present, and at the same time produce articles which are less costly than articles in which the filler consists essentially of the relatively expensive cotton flock. Molded articles formed from a composition comprising a thermosetting resin precondensate within the present disclosure, cotton flock, and the primary filler and in which the primary filler is present in an amount of 50% by weight on the combined weights of the primary filler and cotton flock have an average impact strength which is not greatly below the impact strength of articles molded from compositions in which cotton flock is used exclusively as filler and in an amount equal to the amount of primary filler and cotton flock in the first-mentioned articles. However, the articles molded from the precondensate-primary filler-cotton flock compositions are obtained at considerably less cost because of the substitution of a fibrous cellulose-non-fibrous cellulose ester filler which may be obtained from a waste material for the indicated portion of the more expensive cotton flock. The amount of primary filler employed may be less than 50% on the weight of the fillers present, but that usually involves some sacrifice in the impact strength of the molded article, and especially when the auxiliary filler is wood flour. However, even small amounts of the primary filler improve the impact strength of the articles as compared to articles molded from compositions in which wood flour is used as sole filler and in substantial amount.

While the invention has been illustrated by way of specific molding methods which conform to the standards prevailing in the plastics industry, it will be evident to those skilled in this art that modifications and variations may be made in the details given without departing from the spirit and scope of the invention. Therefore, it is not intended that the invention be limited except as defined by the appended claims.

I claim:

1. A particulate molding composition comprising, on the total composition weight, from about 10% to about 50% of a thorough mixture of a granular thermosetting resin precondensate selected from the group consisting of phenol-aldehyde resin precondensates, urea-aldehyde resin precondensates and melamine-aldehyde resin precondensates and, as a filler, cotton particles carrying non-fibrous organic solvent-soluble cellulose ester, said filler comprising, on the weight thereof, from 45% to 55% of fibrous cellulose in the form of cotton particles and, conversely, from 55% to 45% of the non-fibrous cellulose ester.

2. A particulate molding composition comprising, on the total composition weight, from about 10% to about 50% of a thorough mixture of a granular thermosetting resin precondensate selected from the group consisting of phenol-aldehyde resin precondensates, urea-aldehyde resin precondensates and melamine-aldehyde resin precondensates and a filler material, said filler material comprising at least 50% by weight of a primary filler consisting of from 45% to 55% by weight of fibrous cellulose in the form of cotton particles and, conversely from 55% to 45% by weight of a non-fibrous organic solvent-soluble cellulose ester carried by the cotton particles.

3. A particulate molding composition according to claim 1, characterized in that the precondensate is a granular phenol-formaldehyde resin precondensate and the cellulose ester is cellulose acetate.

4. A particulate molding composition according to claim 2, characterized in that the precondensate is a granular phenol-formaldehyde resin precondensate and the cellulose ester is cellulose acetate.

References Cited in the file of this patent

UNITED STATES PATENTS

| 1,977,643 | Moss | Oct. 23, 1934 |
| 2,072,902 | Moss | Mar. 9, 1937 |
| 2,169,392 | Powers | Aug. 15, 1939 |
| 2,494,513 | Kropscott | Jan. 10, 1950 |
| 2,529,282 | Clare | Nov. 7, 1950 |
| 2,608,536 | Sterling | Aug. 26, 1952 |

FOREIGN PATENTS

| 588,025 | Great Britain | May 12, 1947 |